United States Patent
Sekiyama et al.

(10) Patent No.: US 6,426,577 B1
(45) Date of Patent: *Jul. 30, 2002

(54) THRUST-CONTROLLABLE ROTARY SYNCHRONOUS MACHINE

(75) Inventors: Tokuzou Sekiyama; Satoru Matsubara; Satoshi Nishida; Hiroshi Shibuya, all of Gunma-ken (JP)

(73) Assignee: Nisso Electric Corporation, Gunma-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,467

(22) Filed: Jul. 28, 1999

Related U.S. Application Data (63) Continuation-in-part of application No. 09/301,761, filed on Apr. 29, 1999, now Pat. No. 6,247,913.

(30) Foreign Application Priority Data

May 1, 1998 (JP) ............................................ 10-122228

(51) Int. Cl.$^7$ ................................................. H02K 1/22
(52) U.S. Cl. ........................ 310/162; 310/164; 310/261; 310/258; 310/112
(58) Field of Search ................................. 310/162, 164, 310/261, 258, 112, 68 B (56) References Cited

U.S. PATENT DOCUMENTS

| | | | | |
|---|---|---|---|---|
| 3,467,845 A | * | 9/1969 | Wesolowski | 310/198 |
| 3,599,024 A | * | 8/1971 | Kitamura | 310/263 |
| 4,007,386 A | * | 2/1977 | Rustecki | 310/42 |
| 4,057,369 A | * | 11/1977 | Isenberg et al. | 417/365 |
| 4,503,349 A | * | 3/1985 | Miller | 310/178 |
| 4,547,758 A | * | 10/1985 | Shimizu et al. | 310/156 |
| 4,710,667 A | * | 12/1987 | Whiteley | 310/268 |
| 5,049,771 A | * | 9/1991 | Challita et al. | 310/219 |
| 5,229,676 A | * | 7/1993 | Bood | 310/114 |
| 5,250,865 A | * | 10/1993 | Meeks | 310/90.5 |
| 5,838,085 A | * | 11/1998 | Roesel, Jr. et al. | 310/113 |
| 5,847,483 A | * | 12/1998 | Suzuki et al. | 310/156 |
| 5,864,197 A | * | 1/1999 | Naito et al. | 310/261 |
| 5,952,756 A | * | 9/1999 | Hsu et al. | 310/156 |
| 6,198,196 B1 | * | 3/2001 | De Simmon et al. | 310/268 |

* cited by examiner

*Primary Examiner*—Nestor Ramirez
*Assistant Examiner*—Dang Dinh Le
(74) *Attorney, Agent, or Firm*—Morrison & Foerster LLP (57) ABSTRACT

Rotary synchronous machine includes a stator and a rotor. The stator includes a magnetic field core and an armature core magnetically separated from each other. The rotor includes a plurality of magnetic substance segments which are magnetically separated from each other in a direction of rotation but are magnetically coupled with both of the magnetic field core and armature core. The rotor and magnetic field core are arranged to cause an axial thrust to the rotor depending on the intensity of electric currents passed through filed windings. Namely, the rotor and magnetic field core are arranged in such a manner that magnetic attraction (magnetic coupling) occurs between the rotor and the magnetic field core in a same direction as a rotational axis or at a predetermined non-normal angle relative to the rotational axis. Thus, thrust is produced based on the magnetic attraction between the rotor and the magnetic field core, and this thrust corresponds to the intensity of the electric currents passed through filed windings. Consequently, a traveling position of the rotor in the axial direction can be controlled by providing the magnetic field cores adjacent to opposite sides of the rotor and appropriately controlling the intensity of the filed currents.

17 Claims, 9 Drawing Sheets

THRUST-CONTROLLABLE ROTARY SYNCHRONOUS MACHINE

RELATED APPLICATION

This application is a continuation-in-part application of our corresponding U.S. application Ser. No. 09/301,761 filed Apr. 29, 1999, which is now U.S. Pat. No. 6,247,913.

BACKGROUND OF THE INVENTION

The present invention relates generally to rotary synchronous machines having field and armature windings provided on a stator, and more particularly to a rotary synchronous machine capable of optionally controlling thrust developed in an axial direction of a rotation shaft.

Synchronous motors are available in a variety of designs, such as the rotating-armature, rotating-field and inductor types. The rotating-armature type synchronous motors comprise a magnetic field pole provided on a stator, and an armature winding provided on a rotor. The rotating-field type synchronous motors comprise an armature winding provided on a stator, and a magnetic field pole provided on a rotor. The magnetic field pole in the rotating-field type synchronous motors is typically a permanent magnets positioned on the rotor, or a magnetic field winding that is excited by direct current. Further, the inductor-type synchronous motors comprise a magnetic field pole and an armature winding provided on a stator, and an inductor provided on a rotor and having gear-like teeth and slots.

Since the armature winding is provided on the stator as mentioned, the rotating-field type synchronous motors are substantially free from mechanical damages and breakage and permit easy insulation, so that they are widely used today as drive means for rotating the spindles of various machine tools and others.

However, such rotating-field type synchronous motors where the field pole comprises a permanent magnet positioned on the rotor are disadvantageous in that the permanent magnet itself is expensive and must be secured firmly enough to not accidentally detach from the rotor and also in that it is difficult to provide large capacity because the magnetic field produced is always constant. The rotating-field type synchronous motors where the field pole comprises a magnetic field winding provided on the rotor are also disadvantageous in that they essentially require slip rings and a rotary transformer in order to supply field current to the rotor, resulting in a complex structure.

The rotary drive means do not produce a thrust in an axial direction thereof although they give rotational force, i.e., torque. Therefore, in cases where both rotational force and axial thrust are required, it has been customary to provide a linear drive means separate from the rotary drive means, so as to control the rotational force and axial thrust by the different drive means. However, because at least two separate drive means were necessary for the control of the rotational force and axial thrust, a relatively large space was required. Thus, in most cases, it has been conventional for the entire rotary drive means to be controlled by the linear drive means.

SUMMARY OF THE INVENTION

It is therefore an object of the present invention to provide a thrust-controllable rotary synchronous machine which is, by itself, capable of simultaneously controlling both rotational force and axial thrust.

In order to accomplish the above-mentioned object, the present invention provides a rotary synchronous machine which comprises: a stator; an armature core provided on the stator and having armature windings sequentially wound thereon in a direction of rotation; a rotor including a plurality of magnetic substance segments which are magnetically coupled with the armature core but are magnetically separated from each other in the direction of rotation; and a magnetic field core that is provided on the stator in magnetically-separated relation to the armature core but is magnetically coupled with the armature core via the rotor, the magnetic field core having field windings positioned thereon for producing rotating magnetic poles and thus providingducing, in the rotor, an axial thrust corresponding to intensity of electric currents passed through the field windings.

On the stator, the magnetic field core and armature core are magnetically separated from each other. On the rotor, a plurality of magnetic substance segments are magnetically separated from each other in a direction of rotation but are magnetically coupled with both of the magnetic field core and armature core. Thus, N and S rotating magnetic poles produced on the magnetic field core are coupled together via the rotor and armature core, to form closed magnetic circuitry. Because the rotor and armature core are coupled in a direction normal to the rotation axis, magnetic attraction between the rotor and armature core will contribute only to rotational force. The rotor and magnetic field core, on the other hand, are arranged to cause an axial thrust to the rotor depending on the intensity of the electric currents passed through the filed windings. Namely, the rotor and magnetic field core are arranged in such a manner that magnetic attraction (magnetic coupling) occurs between the rotor and the magnetic field core in a same direction as the rotational axis or at a predetermined non-normal angle relative to the rotational axis. Thus, thrust is produced based on the magnetic attraction between the rotor and the magnetic field core, and this thrust corresponds to the intensity of the electric currents passed through the field windings. Consequently, a traveling position of the rotor in the axial direction can be controlled by providing the magnetic field cores adjacent to opposite sides of the rotor and appropriately controlling the intensity of the field currents.

According to another aspect of the present invention, there is provided a rotary synchronous machine which comprises: a stator; a cylindrical armature core provided along an inner surface of the stator and having armature windings that extend along a direction of rotation and are sequentially received in slots formed radially in the armature core; a rotor including a plurality of cylindrical magnetic substance segments that are magnetically coupled with the inner surface of the armature core but are magnetically separated from each other in the direction of rotation; a first magnetic field core that is provided on the stator in magnetically-separated relation to the armature core but is magnetically coupled with one side surface of the cylindrical magnetic substance segments of the rotor, the first magnetic field core having field windings positioned thereon for producing rotating magnetic poles; a second magnetic field core that is provided on the stator in magnetically-separated relation to the armature core but is magnetically coupled with another side surface of the cylindrical magnetic substance segments of the rotor, the second magnetic field core having field windings positioned thereon for producing rotating magnetic poles; and a current control device that controls intensity of electric currents to be supplied to the first magnetic field core and second magnetic field core, to thereby control an axial thrust of the rotor. In this rotary synchronous machine, a pair of the magnetic field cores are provided adjacent to opposite sides of the rotor, and the axial thrust of the rotor is controlled by the current control device controlling the intensity of the currents passed through the two magnetic field cores.

In a preferred implementation of the present invention, a cylindrical permanent magnet is provided around an outer peripheral surface of the cylindrical magnetic substance segments of the rotor. If the surface of the cylindrical permanent magnet opposed to the rotor is excited to assume the S pole and the surface of the magnet opposed to the armature core is excited to assume the N pole, the surfaces of the magnetic substance segments opposed to the first and second magnetic field cores are excited to assume the S pole; conversely, if the surface of the cylindrical permanent magnet opposed to the rotor is excited to assume the N pole and the surface of the magnet opposed to the armature core is excited to assume the S pole, then the surfaces of the magnetic substance segments opposed to the first and second magnetic field cores are excited to assume the N pole. Thus, the rotor is caused to rotate in response to the electric currents passed through the armature windings even when no field currents are supplied. Then, both the rotational force and the axial thrust can be controlled by controlling the intensity of the field currents. In this case, the axial thrust can be controlled finely by causing the field currents, to be supplied to the first and second magnetic filed cores, to be in phase with each other and producing magnetic attraction between the, first and second magnetic filed cores and the rotor. Further, the axial thrust can be controlled greatly by causing the field currents, to be supplied to the first and second magnetic filed cores, to be in opposite phase and producing magnetic attraction between the first magnetic field core and the rotor while producing magnetic repulsion between the second magnetic field core and the rotor.

In another preferred implementation, the cylindrical permanent magnet of the rotor is tapered at least one end portion thereof to provide a conically slanted surface and the first magnetic field core and second magnetic field core are provided to be magnetically coupled with the conically slanted surface of the rotor. By thus tapering the rotor, a sufficient traveling distance of the rotor greater than a gap between the magnetic substance segments and the magnetic field cores can be guaranteed even through the gap width is small, and it is possible to reduce the necessary field currents and substantially improve the thrust characteristics.

According to still another aspect of the present invention, there is provided a rotary synchronous machine which includes a plurality of improved rotary synchronous machine structures connected together along an axis of a same rotation shaft, and each of the improved rotary synchronous machine structures comprises: a stator; an armature core provided on the stator and having armature windings sequentially wound thereon in a direction of rotation; a rotor including a plurality of magnetic substance segments which are magnetically coupled with the armature core but are magnetically separated from each other in the direction of rotation; and a magnetic field core that is provided on the, stator in magnetically-separated relation to the armature core but is magnetically coupled with the armature core via the rotor, the magnetic field core having field windings positioned thereon for producing rotating magnetic poles and thus causing, to the rotor, an axial thrust corresponding to intensity of electric currents passed through the field windings. This multi-stage arrangement can produce a sufficiently great axial thrust.

BRIEF DESCRIPTION OF THE DRAWINGS

For better understanding of the present invention, the preferred embodiments of the invention will be described in detail below with reference to the accompanying drawings, in which.

DETAILED DESCRIPTION OF THE PREFERRED EMBODIMENTS

Figure 1:
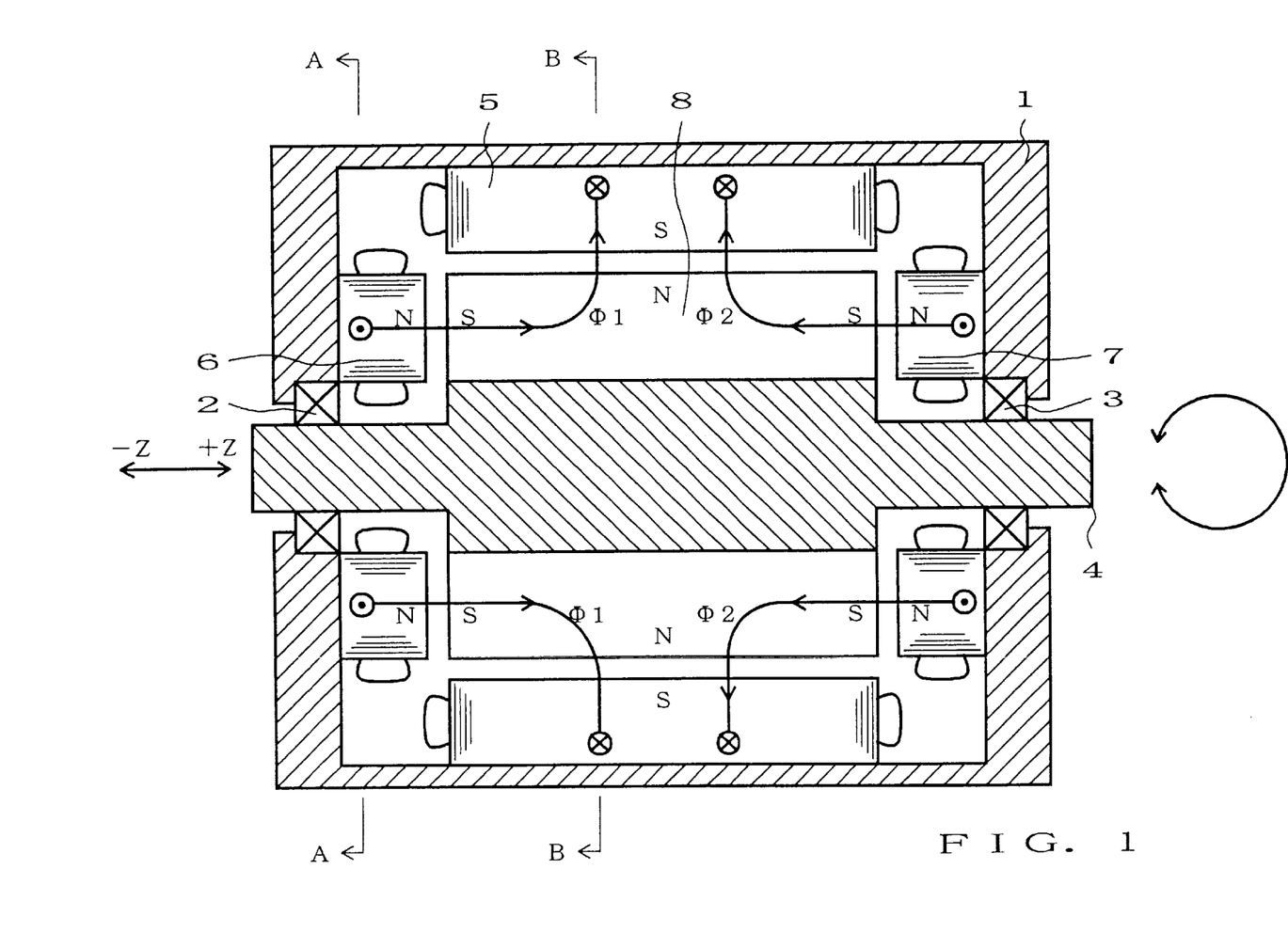
FIG. 1 is a sectional view of a thrust-controllable rotary synchronous motor according to a preferred embodiment of the present invention, taken longitudinally through a rotation shaft thereof.
Figure 2:
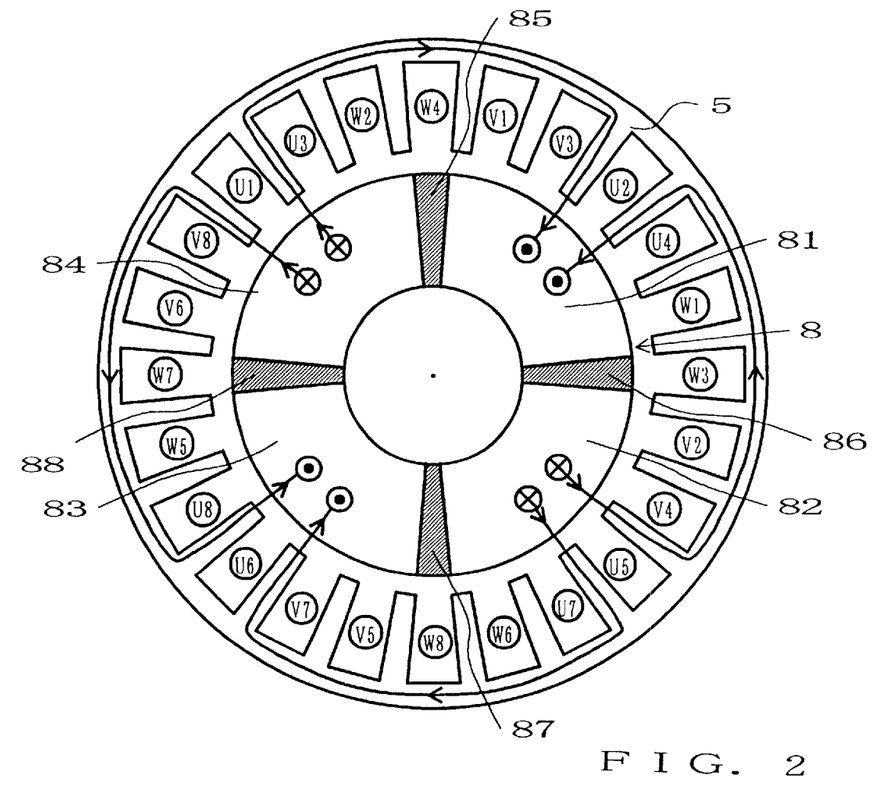
FIG. 2 is a sectional view of the rotary synchronous motor taken along the line A—A of FIG. 1.
Figure 3:
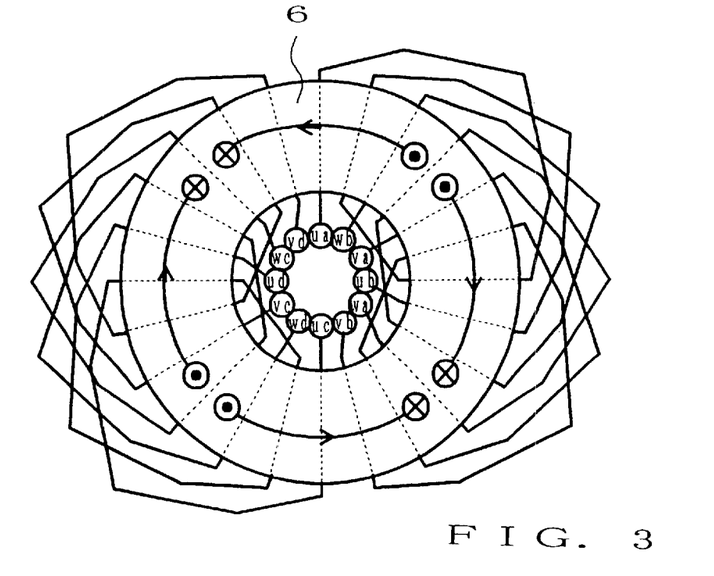
FIG. 3 is a sectional view of the rotary synchronous motor taken along the line B—B of FIG. 1.

In FIGS. 1, 2 and 3, there is shown a thrust-controllable rotary synchronous motor according to one embodiment of the present invention, of which FIG. 1 is a sectional view of the synchronous motor taken longitudinally through its rotation shaft, FIG. 2 is a sectional view of the synchronous motor taken along the line A—A of FIG. 1, particularly showing a detailed structure of a magnetic filed core 6. Further, FIG. 3 is a sectional view of the synchronous motor taken along the line B—B of FIG. 1.

This rotary synchronous motor is of a type which has four magnetic poles and is driven by three-phase alternating currents. As shown, the synchronous motor includes a cylindrical stator frame 1 and the rotation shaft 4 rotatably mounted in the stator frame 1 via bearings 2 and 3 located on opposite ends of the shaft 4. The rotation shaft 4 is also slidable in its longitudinal or axial direction via the bearings 2 and 3. Within the cylindrical stator frame 1, an armature core 5 and two magnetic field cores 6 and 7 are also provided on the central and end inner surfaces of the stator frame 1, respectively, and a rotor 8 having an alternating sequence of magnetic substance segments 81 to 84 and non-magnetic substance segments 85 to 88 is mounted on the rotation shaft 4.

The armature core 5 comprises a cylindrical laminated iron core provided along the inner peripheral surface of the stator frame 1, which has 24 radial slots formed along the inner periphery thereof and around the rotation shaft 4 as shown in FIG. 2. In the individual radial slots of the armature core 5 are received three-phase armature windings (armature windings), one winding portion or coil in each of the slots. The laminated iron core of the armature core 5 comprises a plurality of thin silicon steel rings stacked in the axial direction.

Figure 4A:
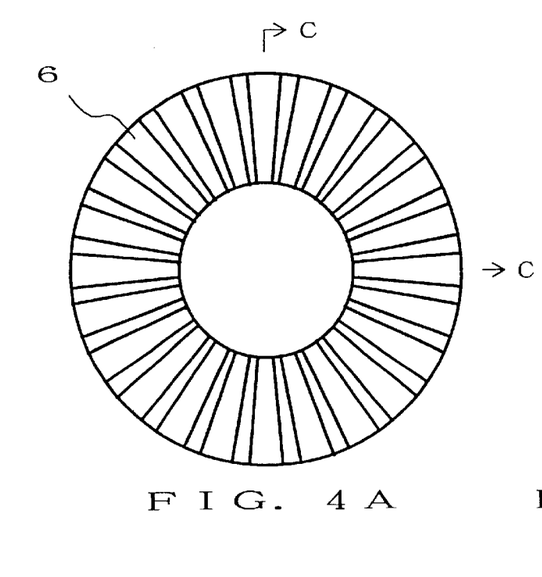
FIG. 4A is a diagram of one of magnetic field cores shown in FIG. 1.
Figure 4B:
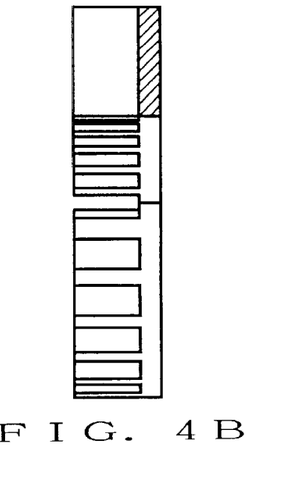
FIG. 4B is a sectional view taken along the line C—C of FIG. 4A.

The magnetic field cores 6 and 7 are similar annular iron rings mounted on the opposed, flat inner end surfaces of the stator frame 1 adjacent to opposite ends of the rotor 8. FIG. 4A is a diagram of one of the magnetic field cores (magnetic field core 6 in the illustrated example) as viewed from the rotor 8, and FIG. 4B is a sectional view taken along the line C—C of FIG. 4A. For simplicity of illustration, no field windings are shown in these figures. As shown in FIGS. 4A and 4B, each of the magnetic field cores 6 and 7 has 24 radial slots formed in its inner surface facing the end surface of the rotor 8. In the radial slots of the magnetic field cores 6 and 7 are received two (first and second) sets of three-phase field windings. Each of the magnetic field cores 6 and 7 comprises a plurality of thin silicon steel rings stacked in the radial direction of the core and hence of the rotation shaft 4.

As typically shown in FIG. 2, the three-phase armature windings on the armature core 5 comprise two (first and second) sets of U-phase, V-phase and W-phase windings that are positioned to be shifted from each other by 120 electrical degrees. In the specification and drawings, the armature windings are denoted by upper-case alphanumerics while the field windings are denoted by lower-case alphanumerics.

The first and second U-phase armature windings are positioned on the armature core 5 via eight slots in ascending order of winding portion numbers, i.e., "U1"-"U2"-"U3"-"U4"-"U5"-"U6"-"U7"-"U8". The first and second V-phase armature windings are positioned on the armature core 5 via eight slots in ascending order of winding portion numbers, i.e., "V1"-"V2"-"V3"-"V4"-"V5"-"V6"-"V7"-"V8". Similarly, the first and second W-phase armature windings are positioned on the armature core 5 via eight slots in ascending order of winding portion numbers, i.e., "W1"-"W2"-"W3"-"W4"-"W5"-"W6"-"W7"-"W8". The U-phase, V-phase and W-phase armature windings are positioned to be shifted from each other by 120 electrical degrees as earlier noted; that is, the U-phase, V-phase and W-phase armature windings are displaced with respect to each other, in the clockwise direction, by four slots.

Similarly to the three-phase armature windings, the three-phase field windings located on the magnetic field core 6, as shown in FIG. 3, comprise two (first and second) sets of u-phase, v-phase and w-phase windings that are positioned to be shifted from each other by 120 electrical degrees.

The u-phase field windings comprise the first u-phase winding wound on the magnetic field core 6 to extend from a winding start portion ua to a winding end portion ub via four slots, and the second u-phase winding wound on the magnetic field core 6 to extend from a winding start portion uc to a winding end portion ud via four slots. The v-phase field windings comprise the first v-phase winding wound on the magnetic field core 6 to extend from a winding start portion va to a winding end portion vb via four slots, and the second v-phase winding wound on the magnetic field core 6 to extend from a winding start portion vc to a winding end portion vd via four slots. Similarly, the w-phase filed windings comprise the first w-phase winding wound on the magnetic field core 6 to extend from a winding start portion wa to a winding end portion wb via four slots, and the second w-phase winding wound on the magnetic field core 6 to extend from a winding start portion wc to a winding end portion wd via four slots.

The three-phase field windings on the magnetic field core 7 are similar in structure to the three-phase field windings on the magnetic field core 6 and positioned in symmetry therewith about the rotor 8.

The respective three-phase field windings on the magnetic field cores 6 and 7 are positioned to be shifted from the corresponding armature windings by 90 electrical degrees. More specifically, the u-phase field windings are positioned to be shifted in the clockwise direction from the U-phase armature windings by three slots (90 electrical degrees), the v-phase field windings are also positioned to be shifted in the clockwise direction from the V-phase armature windings by three slots (90 electrical degrees), and the w-phase magnetic field windings are also positioned to be shifted in the clockwise direction from the W-phase armature windings by three slots (90 electrical degrees). Note that the shift amounts may be approximately in the neighborhood of 900, rather than exactly 90°, depending on the specific structure of the synchronous motor.

The rotor 8 in the illustrated example is generally in a cylindrical shape and provided around the peripheral surface of the rotation shaft 4. The rotor 8 includes an alternating sequence of four magnetic substance segments 81 to 84 and four non-magnetic substance segments 85 to 88 provided axially along the rotation shaft 4, or along a direction of magnetic flux flowing from magnetic poles (N and S poles) produced on the magnetic field cores 6 and 7. The non-magnetic substance segment 85 to 88 act to separate the magnetic substance segments 81 to 84 from each other to ensure that the magnetic substance segments 81 to 84 are not magnetically coupled with each other in the circumferential direction or direction of rotation of the rotor 8. However, the magnetic substance segments 81 to 84 are magnetically coupled with the outer peripheral surface of the armature core 53 and the inner end surface of the magnetic field cores 6 and 7. More specifically, if the spacing of the magnetic substance segments 81 to 84 from the non-magnetic substance segments 85 to 88 is chosen to be about 3–10 mm, then it will suffice that the spacing of the magnetic substance segments 81 to 84 from the armature core 5 and the magnetic field cores 6 and 7 is about 0.5–3 mm. By the magnetic substance segments 81 to 84 being thus magnetically separated from each other by the intervening non-magnetic substance segments 85 to 88, the magnetic flux flowing from the N poles of the magnetic field cores 6 and 7 are easily directed into the armature core 5 by way of the magnetic substance segments 81 to 84.

The following three-phase alternating currents iu, iv and iw, phase-shifted from each other by 120 electrical degrees, are passed through the three-phase windings on the magnetic field core 6:

$iu = im \cdot \sin\omega t$ $iv = im \cdot \sin(\omega t - 2\pi/3)$ $iw = im \cdot \sin(\omega t - 4\pi/3)$, where im represents a maximum electric current value.

By such currents iu, iv and iw flowing through the three-phase field windings on the magnetic field core 6, the magnetic poles producing magnetic flux directed toward the magnetic substance segments 82 and 84 of the rotor 8 (i.e., N poles) and the magnetic poles absorbing magnetic flux from the magnetic substance segments 81 and 83 toward the magnetic field core 6 (i.e., S poles), as shown in FIG. 3, are both caused to occur and rotate in the clockwise direction on the flat end surface of the field core 6 facing the rotor 8. Similar three-phase alternating currents iu, iv and iw are passed through the three-phase field windings on the other magnetic field core 7, so that the magnetic poles (N and S poles) are both caused to occur and rotate in the clockwise direction on the flat end surface of the core 7 facing the rotor 8.

Magnetic fields in and around the magnetic poles (N and S poles) produced by the three-phase currents assume a sinusoidal magnetic flux distribution in the direction of rotation, and the magnetic flux can be expressed as follows if the maximum magnetic flux is represented by Φ and the pole center is represented by θ=0:

$$\Phi = \Phi m \cdot \cos \theta$$

If the currents flowing through the three-phase field windings are controlled in such a manner that the pole center of the magnetic fields produced by the field windings coincides with an "easiest-to-magnetize" surface portion of the rotor 8, the rotor 8 will be magnetized in a predetermined direction and assume a magnetic flux density that can be approximately expressed by $$B = Bm \cdot \cos \theta$$

Namely, the magnetic substance segments 81 to 84 of the rotor 8 are magnetized in predetermined directions in response to the magnetic poles (N and S poles) produced on the magnetic field cores 6 and 7. For example, by the currents iu, iv, iw, N poles are produced on the surfaces of the field cores 6 and 7 facing the magnetic substance segments 82 and 84 and S poles are produced on the surfaces of the field cores 6 and 7 facing the magnetic substance segments 81 and 83, in response to which S poles are produced on the flat surfaces of the magnetic substance segments 82 and 84 facing the magnetic field cores 6 and 7 and N poles are produced on the curved surfaces of the magnetic substance segments 82 and 84 facing the armature core 5.

Similarly, N poles are produced on the flat surfaces of the magnetic substance segments 81 and 83 facing the magnetic field cores 6 and 7 and S poles are produced on the curved surfaces of the magnetic substance segments 81 and 83 facing the armature core 5.

Namely, as typically shown in FIG. 1, the magnetic flux Φ1 flowing from the two N poles of the field core 6 enters the magnetic substance segments 82 and 84 through their S-pole flat surfaces. Similarly, the magnetic flux Φ2 flowing from the two N poles of the other magnetic field core 7 enters the magnetic substance segments 82 and 84 through their S-pole flat surfaces. The magnetic flux Φ1 and Φ2, having thus entered the magnetic substance segments 82 and 84, enters the armature core 5 via their N-pole curved surfaces, passes along the outer peripheral portion of the core 5, and then enters the magnetic substance segments 81 and 83 via their S-pole curved surfaces. After this, the magnetic flux Φ1 and Φ2 enters the S-pole flat surfaces of the magnetic field cores 6 and 7 from the N-pole flat surfaces of the magnetic substance segments 81 and 83. The magnetic flux Φ1 and Φ2, having entered the magnetic field cores 6 and 7, passes therethrough to reach the respective N poles. Thus, in this rotary synchronous machine, predetermined closed magnetic circuits are formed by the magnetic field cores 6 and 7, rotor 8 and armature core 5.

The rotary synchronous machine arranged in the above-noted manner gives rise to attraction between the opposed surfaces of the magnetic substance segments 81 to 84 and the magnetic field cores 6 an,d 7, on the basis of the magnetic flux Φ1 and Φ2 produced via the cores 6 and 7. The magnitude of the attraction depends on the magnitude of the magnetic flux Φ1 and Φ2. Therefore, if the magnetic flux Φ1 produced via the magnetic field core 6 is equal in magnitude to the magnetic flux Φ2 produced via the magnetic field core 7, the attraction occurring on the opposed surfaces cancels each other, so that the rotary synchronous machine will generate torque T based solely on the magnetic flux Φ1 and Φ2.

On the other hand, the following three-phase alternating currents IU, IV and;IW, phase-shifted from each other by 120 electrical degrees, are passed through the three-phase windings on the armature core 5:

$$IU = Im \cdot \sin \omega t$$
$$IV = Im \cdot \sin(\omega t - 2\pi/3)$$
$$IW = Im \cdot \sin(\omega t - 4\pi/3)$$

Because the three-phase armature windings are phase-shifted from the corresponding field windings by 120 electrical degrees in this case, torque T is developed in accordance with the well-known Fleming's rule, which causes rotation of the rotor 8 (i.e., the rotation shaft 4). In this case, only the intensities of the currents passed through the field and armature windings have to be controlled in order to control the intensity of this torque T. Although the armature currents may also produce magnetic flux, the flux has only a negligible influence because reluctance of the rotor is set to be great in the direction of the magnetic flux and thereby difficult to magnetize.

If, on the other hand, the magnetic flux Φ1 produced via the magnetic field core 6 is different in magnitude from the magnetic flux Φ2 produced via the magnetic field core 7, an axial thrust will occur in the rotor 8 (i.e., the rotation shaft 4) depending on magnitudinous relation between the flux Φ1 and Φ2. Namely, if the magnitude of the magnetic flux Φ1 produced via the magnetic field core 6 is smaller than the magnitude of the magnetic flux Φ2 produced via the magnetic field core 7, an axial thrust in a "+Z" direction occurs in the rotor 8 (rotation shaft 4); however, if the magnitude of the magnetic flux Φ1 produced via the magnetic field core 6 is greater than the magnitude of the magnetic flux Φ2 produced via the magnetic field core 7, an axial thrust in a "−Z" direction occurs in the rotor 8 (rotation shaft 4).

Namely, the magnitude of the thrust thus produced depends on a difference between field currents IfL and IfR fed to the magnetic field cores 6 and 7, i.e., a difference between the magnetic flux Φ1 and Φ2. Therefore, the axial thrust can be controlled by adjusting the respective intensities of the field currents IfL and IfR. It should also be obvious that the torque T can be controlled as desired by controlling the field currents IfL and IfR to the magnetic field cores 6 and 7. In addition, the magnitude of the axial thrust. can be controlled while the torque T remains constant, in which case it is only necessary to control the respective intensities of the magnetic flux Φ1 and Φ2 while keeping constant a total value of the magnetic flux Φ1 and Φ2.

For accurate positioning control of the rotation shaft 4 in the axial direction, the synchronous machine preferably includes a linear position detector capable of detecting a positional relationship between the stator frame 1 and the rotation shaft 4, so as to adjust the field currents IfL and IfR on the basis of a position signal from the linear position detector. In this case, it is essential to control the field currents IfL and IfR so that the torque T is kept constant.

The rotary synchronous machine arranged in the above-mentioned manner achieves the superior benefit that the rotating power and axial thrust can be simultaneously controlled by just controlling the field currents to be supplied to field coils, without addition of any extra thrust-producing component.

Figure 5:
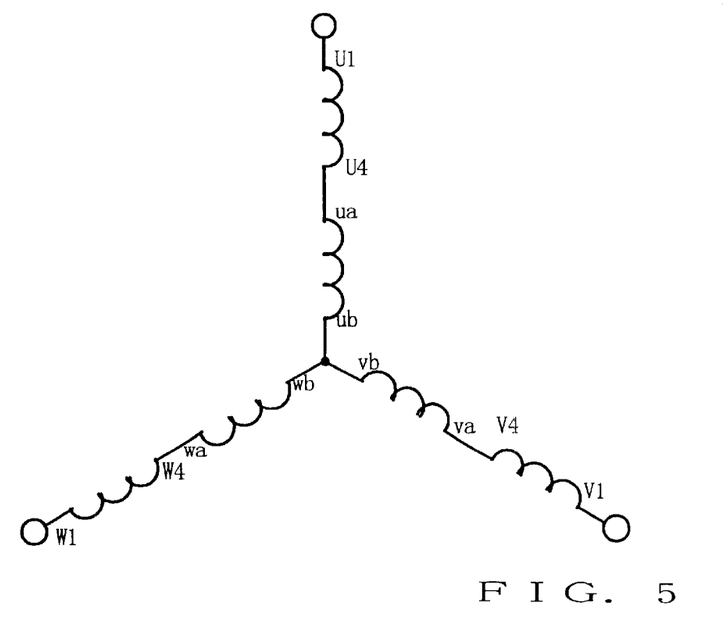
FIG. 5 is a diagram illustrating an exemplary wiring organization between armature and field windings in the rotary synchronous motor of FIG. 1.

FIG. 5 is a diagram illustrating exemplary wiring between the armature and field windings in the rotary synchronous motor. In the instance where the armature and field windings are mechanically positioned to be phase-shifted from each other by 90 electrical degrees as shown in FIG. 2, the armature and field windings can be wound in series with each other, and the motor can be controlled via a single inverter as an A.C. motor having series winding characteristics. In this case, a desired axial thrust can be generated by adding a separate thrust-controlling winding to the field, windings and controlling the intensity of the field currents to be supplied to the field windings. If, on the other hand, the armature and field windings are mechanically positioned to be in phase with each other in stead of being phase-shifted by 90 electrical degrees, it suffices that the field and armature currents are phase-shifted from each other by 90 electrical degrees via different inverters; in this case too, a desired axial thrust can be generated by adding a separate thrust-controlling winding to the field windings and controlling the intensity of the field currents to be supplied to the field windings.

Figure 6:
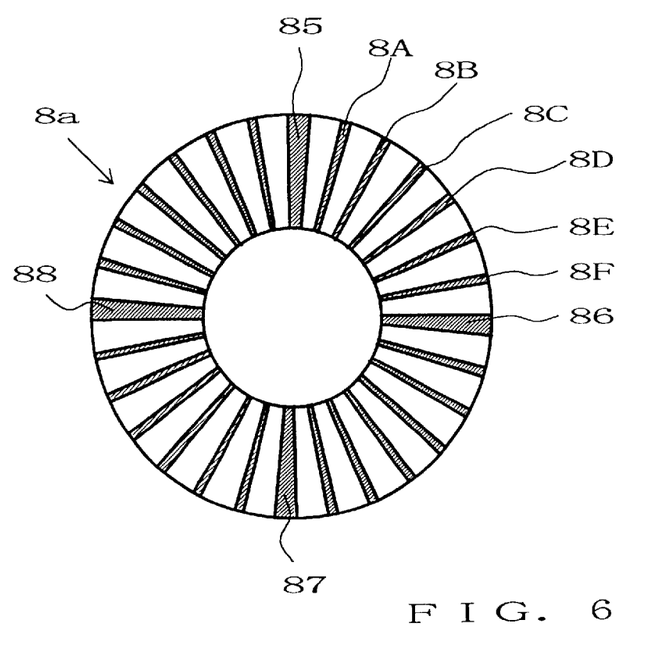
FIG. 6 is a diagram illustrating another embodiment of a four-pole rotor of FIG. 2.
Figure 7:
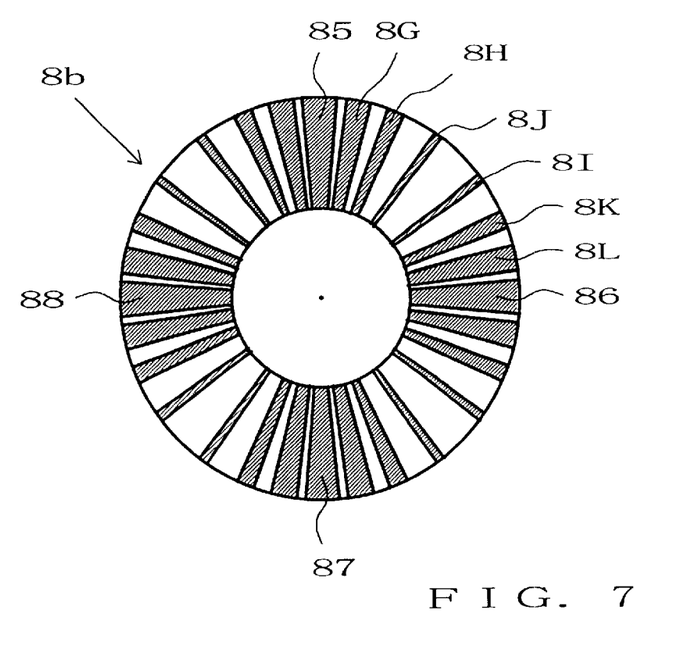
FIG. 7 is a diagram illustrating still another embodiment of the four-pole rotor of FIG. 2.

FIGS. 6 and 7 are both diagrams illustrating other embodiments of the four-pole rotor 8 of FIG. 2. In the rotor 8a of FIG. 6, the magnetic substance segments 81 to 84 provided along the direction of passage of the magnetic flux produced by the field windings (i.e., axially along the rotation shaft) are magnetically separated from each other more finely by additional non-magnetic substance segments 8A to 8F in the rotational or angular direction of the rotor 8a. For simplicity of illustration, no reference characters are attached to the additional non-magnetic substance segments separating the magnetic substance segments 82 to 84 in FIG. 6. Degree of the magnetic separation attained by the additional non-magnetic substance segments 8A to 8F in this embodiment is far smaller than that attained by the main non-magnetic substance segments 85 to 88 having been described earlier in relation to FIG. 2. For example, if the thickness (as measured in the rotational direction of the rotor) of each of the main non-magnetic substance segments 85 to 88 is between about 3–10 mm, the thickness (as measured in the angular direction of the rotor) of each of the additional non-magnetic substance segments 8A to 8F may be chosen to be between about 0.3–3 mm. With this rotor 8a thus arranged, it is possible to effectively preclude influences of the magnetic flux produced by the armature currents, i.e., the armature reaction.

Rotor 8b of FIG. 7 is similar to the rotor 8a of FIG. 6 in that the magnetic substance segments 81 to 84 provided along the direction of passage of the magnetic flux produced by the field windings (i.e., along the rotation shaft) are magnetically separated from each other more finely by additional non-magnetic substance segments 8G to 8L in the rotational (angular) direction of the rotor 8b. The rotor 8b, however, is different from the rotor 8a in that the respective thicknesses (as measured in the rotational direction of the rotor) of the individual magnetic substance segments 81 to 84 as separated by the additional non-magnetic substance segments 8G to 8 correspond to a sinusoidal distribution of densities of the magnetic flux produced by the magnetic field cores. For simplicity of illustration, no reference characters are attached to the non-magnetic substance segments separating the magnetic substance segments 82 to 84 in FIG. 7.

While the magnetic substance segments 81 to 84 separated by the additional non-magnetic substance segments 8A to 8F all have a same thickness in the rotor 8a of FIG. 6, the magnetic substance segments 81 to 84 separated by the additional non-magnetic substance segments 8G to 8L have different thicknesses corresponding to the sinusoidal distribution of the magnetic flux densities in the rotor 8b of FIG. 7. That is, in each of the magnetic substance segments 81 to 84 of the rotor 8b, a portion closer to the adjacent main non-magnetic substance segments 85, 86; 86, 87; 87, 88; 88, 85 than the other portions is smaller in thickness than the other portions, with a portion located centrally between the adjacent main non-magnetic substance segments having the greatest thickness. In other words, the respective thicknesses of the additional non-magnetic substance segments 8G, 8H, 8J are chosen to become sequentially smaller in the mentioned order (i.e., from 8G to 8J), while the respective thicknesses of the additional non-magnetic substance segments. 8I, 8K, 8L are chosen to become sequentially greater in, the mentioned order (i.e., from 8I to 8L).

With the rotor 8b thus arranged, magnetic poles (N and S poles) corresponding to the sinusoidal distribution of the magnetic flux produced by the magnetic field currents can be produced on the outer peripheral surface of the rotor 8b, and thus it is possible to remarkably improve the rotational characteristics of the synchronous motor.

Figure 8:
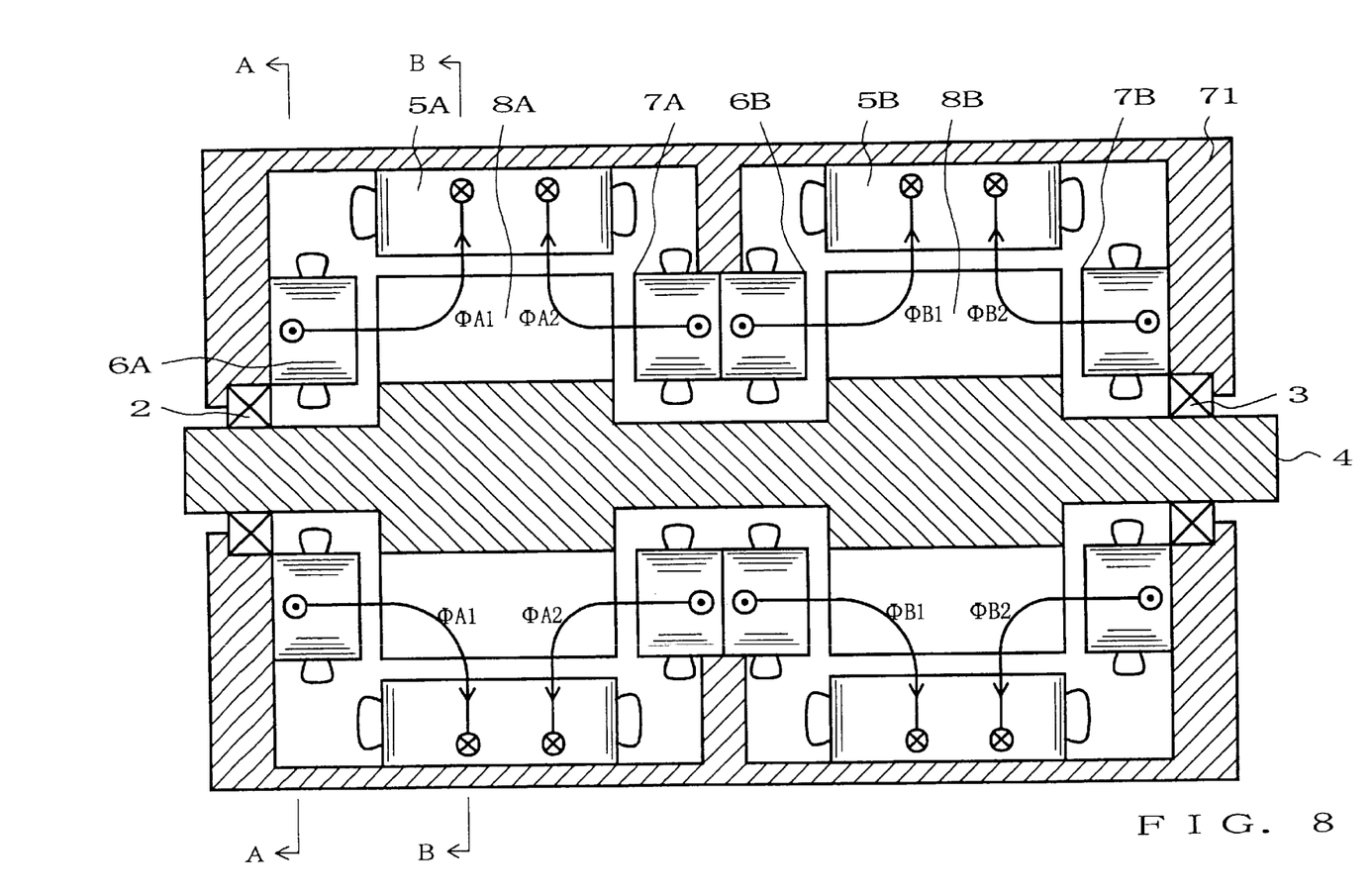
FIG. 8 is a longitudinal sectional view of a rotary synchronous motor in accordance with another embodiment of the present invention which comprises a plurality of the linear motor structures of FIG. 1 connected in series with each other.

Further, FIG. 8 is a longitudinal sectional view illustrating a rotary synchronous motor according to still another embodiment of the present invention, which comprises a pair of the same synchronous motor structures as shown in FIG. 1 that are connected together in series. Those elements denoted with the same reference characters as in FIG. 1 are the same in structure as the counterparts of FIG. 1 and will not be described here to avoid unnecessary duplication. Thrust control in the rotary synchronous motor of FIG. 8 is performed in substantially the same manner as in the above-described embodiment of FIG. 1. Whereas only two synchronous motors are connected in series in the illustrated example, three or more such synchronous motors may of course be connected in series; the thrust and rotational power controllable by this synchronous motor can be made greater depending on the number of the series-connected synchronous motor structures.

Figure 9:
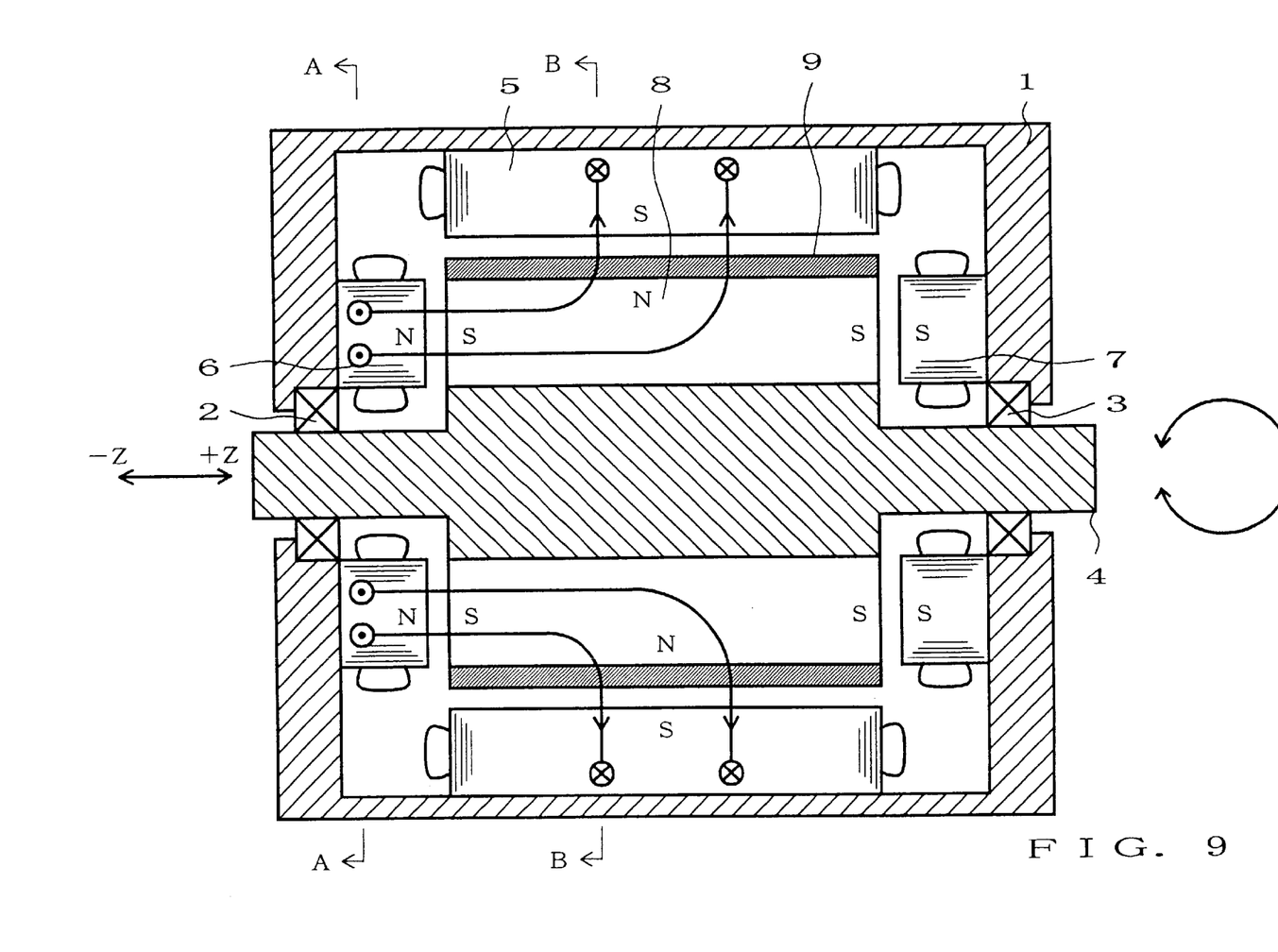
FIG. 9 is a longitudinal sectional view of a rotary synchronous motor in accordance with still another embodiment of the present invention.

FIG. 9 is a longitudinal sectional view illustrating a rotary synchronous motor according to still another embodiment of the present invention, which is different the synchronous motor of FIG. 1 in that a cylindrical permanent magnet 9 is provided along the outer peripheral surface of the magnetic substance segments 81 to 84 of the rotor 8. Inner surface portion of the cylindrical permanent magnet 9 in contact with magnetic substance segments 81 and 83 of the rotor 8 is magnetized into the N pole while an outer surface portion, corresponding to the inner surface portion, of the permanent magnetic 9 opposed to the armature core 5 is magnetized into the S pole. Therefore, the surfaces of the magnetic substance segments 81 and 83 of the rotor 8 opposed to the magnetic field cores 6 and 7 become N poles. Similarly, an inner surface portion of the cylindrical permanent magnet 9 in contact with the magnetic substance segments 82 and 84 of the rotor 8 is magnetized into the S pole while an outer surface portion, corresponding to the inner surface portion, of the permanent magnet 9 opposed to the armature core 5 is magnetized into the N pole. Therefore, the surfaces of the magnetic substance segments 82 and 84 of the rotor 8 opposed to the magnetic field cores 6 and 7 become S poles.

Figure 10:
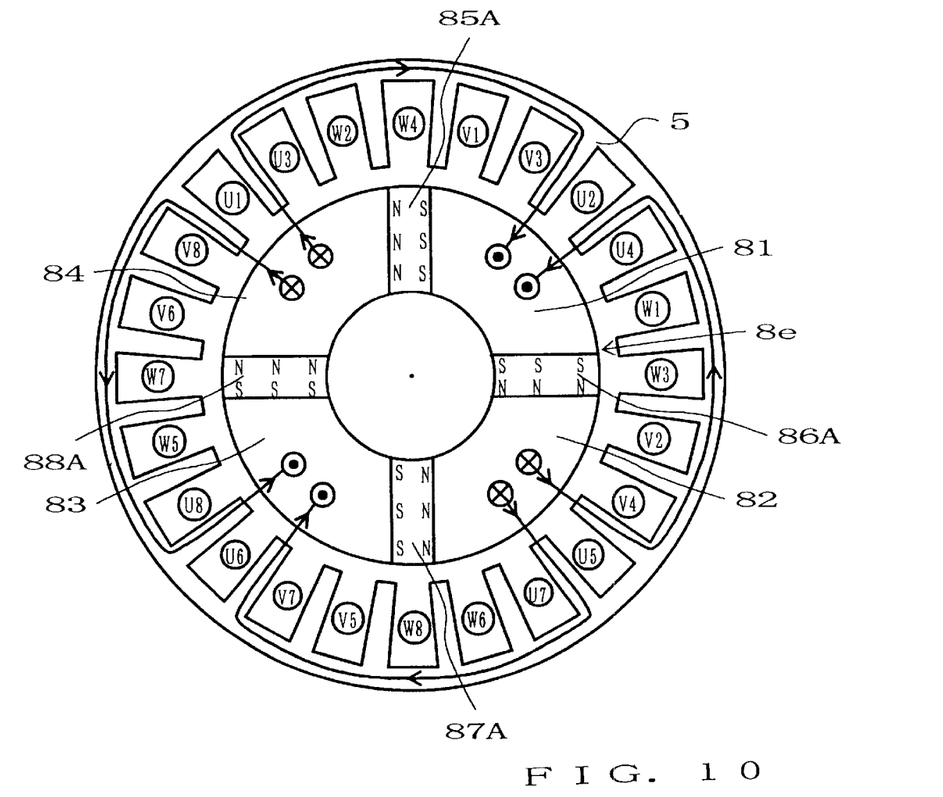
FIG. 10 is a diagram illustrating still another embodiment of the four-pole rotor of FIG. 2.

The provision of such a cylindrical permanent magnet 9 around the outer periphery of the magnetic substance segments 81 to 84 can rotate the rotor 8 without having to passing field currents through the field windings. In this case, however, torque control can not be performed optimally over a wide range because the torque depends greatly on the intensities of the magnetic poles of the permanent magnet 9 and armature currents. Thus, the synchronous motor of the invention is constructed to permit optimum torque control over a wide range by providing a hybrid-type rotor 8, which is capable of controlling both the intensity of the magnetic poles of the permanent magnet 9 by appropriately controlling the intensity of the electric currents passed through the field windings and the intensity of the magnetic flux produced from the field windings. As an alternative, the non-magnetic substance segments 85 to 88 may of course be replaced by permanent magnets 85A to 88A that are provided between the magnetic substance segments 81 to 84 of the rotor 8 and the rotation shaft 4 in such way that the N poles of the permanent magnets 85A to 88A are opposed to the magnetic substance segments 82 and 84, as shown in FIG. 10.

In the illustrated example of FIG. 9, the magnetic field cores 6 and 7 are energized by the field currents phase-shifted by 90 degrees. If the surface of the magnetic field core 6 opposed to the rotor 8 is excited to assume the N pole, the surface of the other magnetic field core 7 opposed to the rotor 8 is excited to assume the S pole; conversely, if the surface of the magnetic field core 6 opposed to the rotor 8 is excited to assume the S pole, the surface of the other magnetic field core 7 opposed to the rotor 8 is excited to assume the N pole. In this way, magnetic repulsion occurs between the rotor 8 and the magnetic field core 7 while magnetic attraction occurs between the rotor 8 and the magnetic field core 6. In this case, the thrust resulting from the magnetic attraction by the permanent magnet 9 can be maintained without the field currents, as long as the rotor 8 is in contact with or in proximity to the magnetic field core 6 or 7. Further, the rotation shaft 4 may be positioned in the axial or thrust direction by adjustment of the field currents IfL and IfR similarly to the embodiment of FIG. 1, and the thrust itself may also be controlled by adjustment of the field currents IfL and IfR. In addition, a plurality of the synchronous motor structures as shown in FIG. 9 may be combined together in a multi-stage fashion as illustrated in FIG. 8, to thereby produce a greater thrust.

Figure 11:
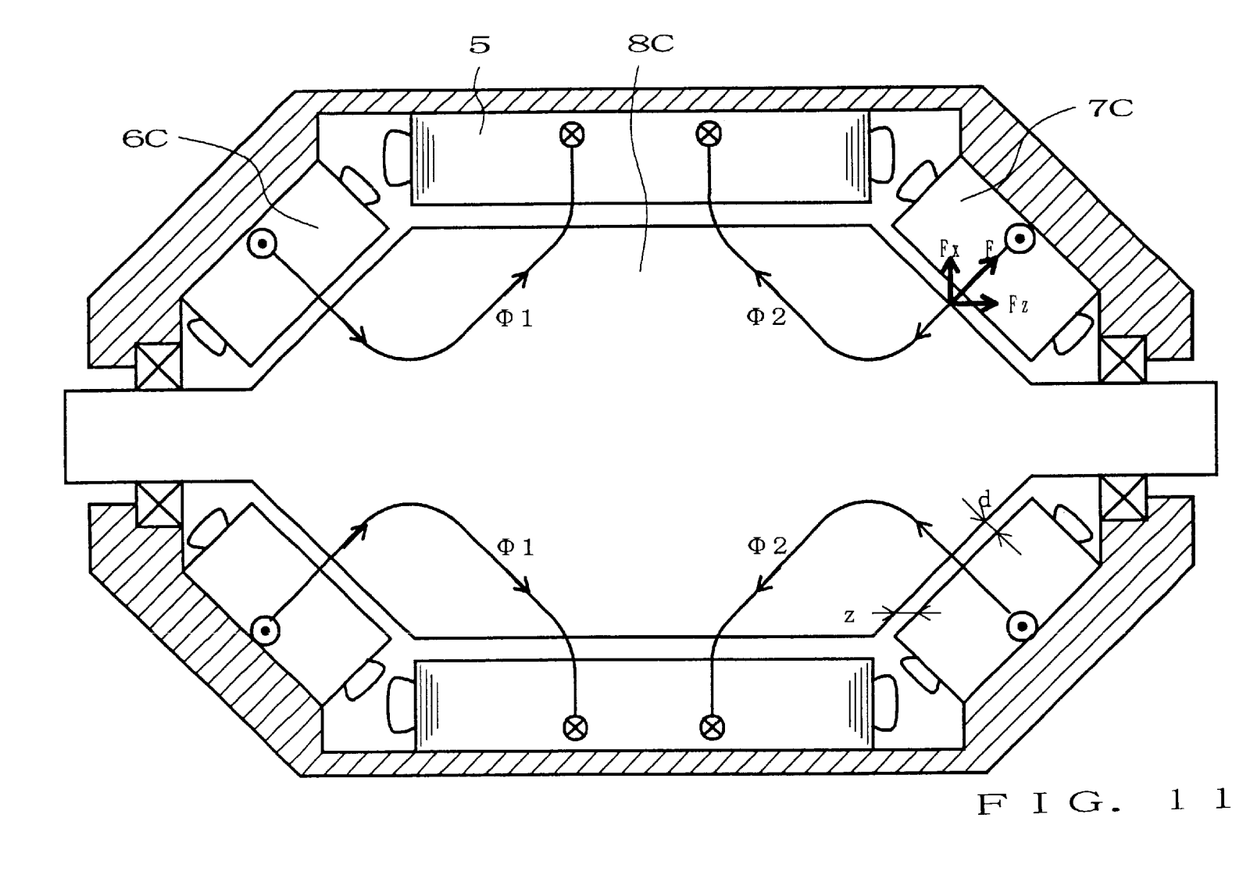
FIG. 11 is a longitudinal sectional view of a rotary synchronous motor in accordance with still another embodiment of the present invention.

FIG. 11 is a longitudinal sectional view illustrating a rotary synchronous motor according to yet another embodiment of the present invention, which is different the synchronous motor of FIG. 1 in that opposite end portions of the rotor 8C, opposed to the magnetic field cores 6C and 7C to produce magnetic attraction, are tapered outwardly relative to the rotational axis to thereby provide end surfaces slanted at a predetermined angle relative to the rotational axis. By the tapered configuration of the rotor 8C there is established a relationship that the traveling distance Z of the rotor 8C is greater than a width of a gap d on the magnetic circuitry between the rotor 8C and the magnetic field cores 6C and 7C (i.e., z>d), so that a sufficient traveling distance Z of the rotor 8C greater than the gap width d can be quaranteed even through the gap width d is small and it is possible to reduce the necessary field currents and substantially improve the thrust characteristics.

Figure 12:
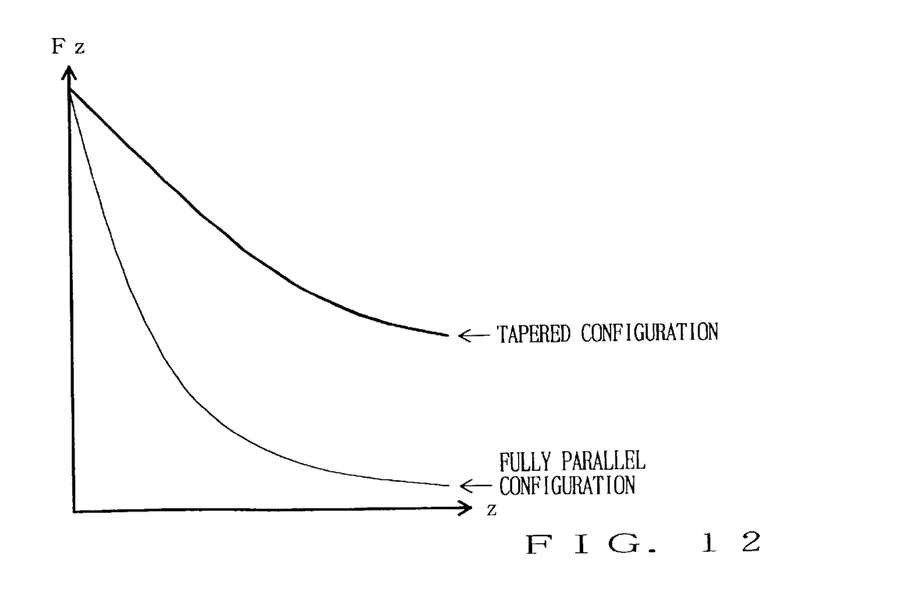
FIG. 12 is a graph showing relationship between a traveling distance and thrust in the case where the side surface of the rotor extend parallel to the rotational axis along the full length of the rotor as in the synchronous motor of FIG. 1 and in the case where the rotor has opposite end portions tapered relative to the rotational axis.

FIG. 12 is a graph showing relationship between the traveling distance z and the thrust Fz in the case where the side surface of the rotor 8C extend parallel to the rotational axis along the full length of the rotor 8C as in the synchronous motor of FIG. 1 and in the case where the rotor 8C has opposite end portions tapered relative to the rotational axis. As apparent from FIG. 12, in the "fully parallel" configuration where the side surface of the rotor 8C extend parallel to the rotational axis (the synchronous motor of FIG. 1), the thrust Fz decreases sharply as the traveling distance z becomes greater. However, in the "tapered" configuration of FIG. 11, the thrust decrease can be less than in the fully parallel configuration irrespective of an increase in the traveling distance z. This is because the tapered configuration achieves a greater traveling distance Z than the fully parallel configuration even when the gap width d is the same.

As shown in FIG. 11, magnetic attraction F is produced between the rotor 8C and the magnetic field cores 6C and 7C in a direction normal to the tapered side surface of the rotor 8C. This magnetic attraction F is split into force in the axial direction (i.e., thrust) Fz and force Fx in the radial direction. While the force Fz in the radial direction cancel each other, the force (thrust) Fz in the axial direction combine with each other in a single direction, thus giving thrust substantially equal to that given in the fully parallel (i.e., non-tapered) configuration where the side surface of the rotor 8C extends parallel to the rotational axis along the full length of the rotor 8C. With this arrangement, the synchronous motor of FIG. 11 can function as magnetic bearings which are advantageous in both the axial and radial directions, by controlling the magnitudes of the magnetic flux $\Phi 1$ and $\Phi 2$. Note that whereas the rotor 8C of FIG. 11 is shown as tapered at opposite end portions, only one of the end portions of the rotor may be tapered.

Figure 13:
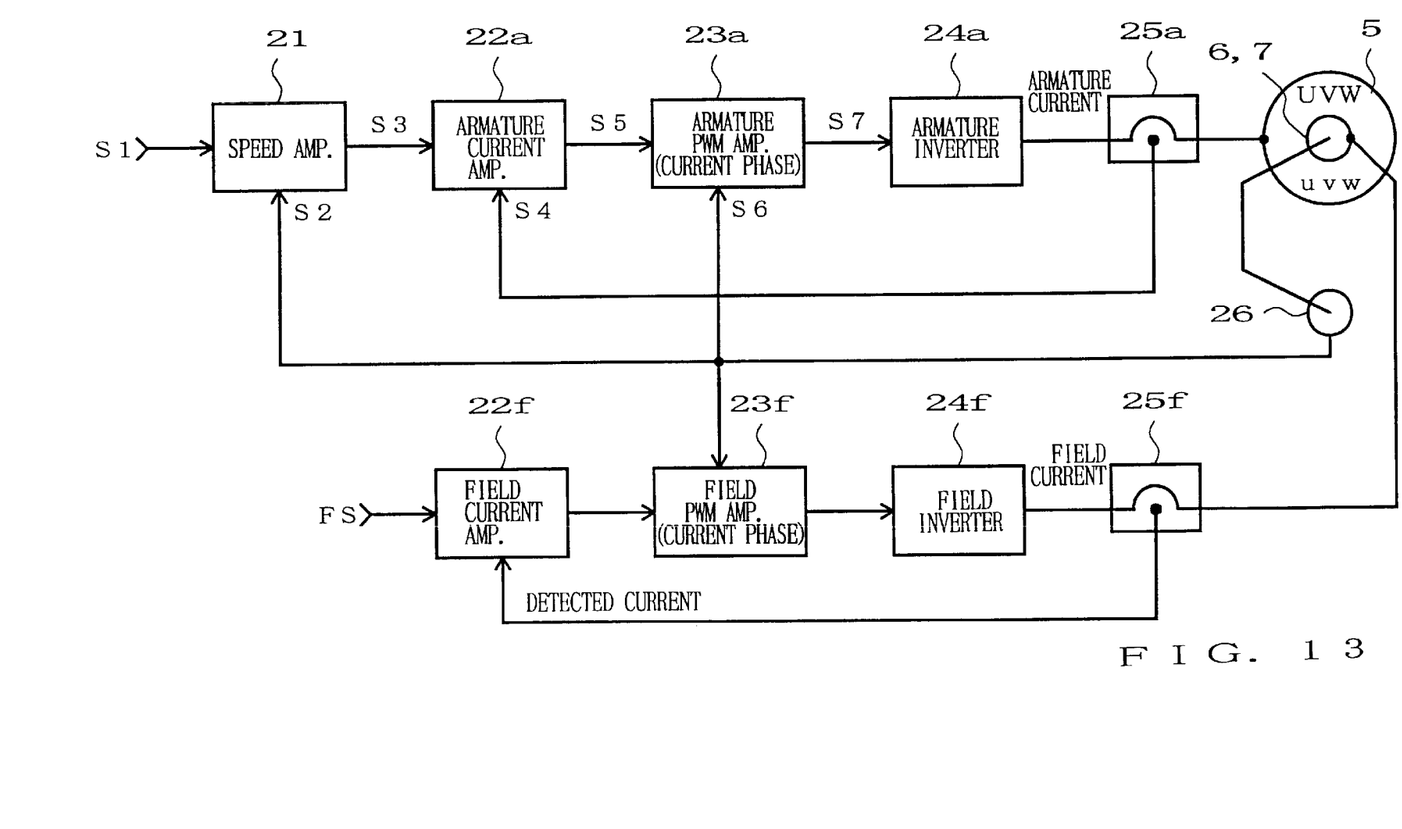
FIG. 13 is a is a block diagram illustrating an A.C. servo motor system employing the synchronous motor according to the present invention.

FIG. 13 is a block diagram illustrating an A.C. servo motor system employing the synchronous motor according to the present invention. The A.C. servo motor system will be described below in relation to a case where the armature windings and field windings of the synchronous motor are mechanically positioned to be in phase with each other, rather than being phase-shifted by 90 electrical degrees, and field currents and armature currents are supplied to the filed windings and armature windings such that they are phase-shifted by 90 electrical degrees.

To the rotation shaft of the synchronous motor is connected a detector 26, such as a rotary encoder or rotary resolver, for detecting a rotating speed and magnetic pole positions of the motor. The detector 26 feeds signal S2 indicative of a rotating speed of the motor back to a speed amplifier 21 and also feeds signal S6 indicative of rotating positions of the magnetic fields or magnetic pole positions of, the motor back to an armature PWM amplifier 23a and a field PWM amplifier 23f.

The speed amplifier 21 receives rotating speed instruction S1 as well as the motor rotating speed signal S2 from the detector 26 to thereby calculate an offset between the speeds indicated by the signals S1 and S2 and then supplies a current amplifier 22 with armature current instructing signal (torque signal) S3 corresponding to the thus-calculated speed offset. Armature current amplifier 22a amplifies a difference between electric current feedback signal S4 detected by a current detecting isolator 25 (i.e., feedback signal of detected U-phase and V-phase currents) and the armature current instructing signal S3 from the speed amplifier 21 and then supplies the armature PWM amplifier 23a with the amplified current difference as input signal S5. The armature PWM amplifier 23a, in turn, supplies an armature inverter 24a with three-phase PWN signal, i.e., inverter control signal S7 on the basis of the input signal S5 from the current amplifier 22 and magnetic pole position signal S6 from the detector 26. The armature inverter 24a is driven by the inverter control signal S7, to supply armature currents to the armature windings of the individual phases in the synchronous motor. Control system for the field currents is similar to that for the armature currents except that it does not include the speed amplifier 21. This. control system for the field currents includes a magnetic field current amplifier 22f, a magnetic field PWM amplifier 23f, a magnetic field inverter 24f and a magnetic field current detecting isolator 25f. Because no speed aplifier is included in this magnetic field currents control, magnetic field current instructing signal FS is input directly to the magnetic field current amplifier 22f. It should be obvious that whereas only one magnetic field current control is shown in FIG. 13, two such magnetic field current controls must be provided in corresponding relation to the two sets of the filed windings. Here, thrust of the synchronous motor is controlled as necessary depending on the level of the magnetic field current instructing signal FS.

With the A.C. servo motor system of FIG. 13 arranged in the above-mentioned manner, the synchronous motor according to the present invention is allowed to operate as an A.C. servo motor rotating at a desired speed and also with a desired thrust. Whichever rotating position the rotation shaft may be in, the A.C. servo motor system of FIG. 13 detects the shaft's rotating position so as to control the respective phases of the three-phase magnetic field currents in such a manner that the pole center of the rotation shaft coincides with the pole center of the rotating magnetic fields. This allows the rotation shaft to be always revolved with maximum torque The magnetic substance segments in the above-mentioned embodiments may be made of any of iron material (e.g., pure iron, soft iron, cast steel, magnetic steel band, or nondirectional or directional silicon steel), iron-nickel alloy (e.g., Permalloy, Isoperm or Perminvar), dust core (carbonyl dust core, Permalloy dust core or Sendust dust core), or ferrite (sipinel ferrite, composite ferrite such as Mn—Zn ferrite, Cu—Zn ferrite, Ni—Zn ferrite or Cu—Zn—Mg ferrite).

The embodiments of FIGS. 1 and 11 have been described above in relation to the case where the magnetic field cores are provided adjacent to the opposite end portions of the rotor, only one such magnetic field core may be provided adjacent to one end portion of the rotor. Where a plurality of the inventive linear motor structures are connected together in a multi-stage fashion as shown in FIG. 8, only one such magnetic field core may be provided adjacent to one end portion of the rotor; in this case, thrust can be produced only in one direction although no positioning in the axial direction is permitted. Further, the rotor of FIG. 1 or 11 may be supported only by the bearing 2; particularly, in the case of FIG. 11, the rotor can function very efficiently by virtue of magnetic attraction acting in the radial direction.

Although the present invention has been described so far as implemented as synchronous motors, the invention may also be applied as a synchronous power generator, where electromotive force is induced in the armature windings by supplying the field windings with currents corresponding to a rotating position of the rotor and is extracted from the armature windings. In such a case, a position detector for detecting a rotating position of the rotor may be provided on the same rotation shaft as the rotor so that the field currents are controlled depending on the detected rotating position.

Further, although the description has been made above about four-pole/24-slot or double-pole/12-slot synchronous machines, the numbers of the poles, and slots should not be understood as limited to the above-mentioned, or rather the combination of the numbers may be selectively varied as necessary. Furthermore, while the-filed windings have been described as single-layer lap windings in the example of FIG. 3, they may be double-layer lap windings.

Furthermore, whereas the preferred embodiments have been described in relation to the case where the rotor is located inside the armature core, the basic principle of the present invention is of course applicable to a situation where the rotor is located outside the armature core, i.e., a so-called "out rotor" arrangement.

In summary, the rotary synchronous machine achieves the superior benefit that it can simultaneously control both rotational force and axial thrust by itself.

What is claimed is:

1. A rotary synchronous machine comprising:

a stator frame;

an armature core secured to said stator frame and having armature windings sequentially wound thereon in a direction of rotation;

a rotor rotatable relative to said stator frame and having a plurality of magnetic substance segments which are magnetically separated from each other in the direction of rotation;

first and second magnetic field cores secured to said stator frame in magnetically-separated relation to said armature core, each of said first and second magnetic field cores having field windings positioned thereon, said field windings being excited by multi-phase alternating currents to produce a rotating magnetic field independently in each of said first and second magnetic field cores; and a linear position detector, said linear position detector detects a positional relationship between the stator frame and the rotor and outputs a positional signal, wherein said magnetic substance segments of said rotor each have axial end surfaces spaced from said magnetic field cores via first air gaps, said magnetic substance segments of said rotor each have a circumferential surface spaced from said armature core via a second air gap, and magnetic flux paths of said rotating magnetic field produced from each one of said magnetic field cores pass through said one of said magnetic field cores, one of said first air gaps, said magnetic substance segments, said second air gap and said armature core to thereby produce magnetic poles on the surfaces of said magnetic substance segments facing said one of said first air gaps and said second air gap, wherein an axial thrust depending on a difference between first intensity of the multi-phase altering current supplied to the field windings of said first magnetic core and intensity of the multi-phase alternating currents supplied to the field windings of said second magnetic core is produced in said rotor, and wherein axial thrust is controlled by controlling at least one of said first and second intensities of the multi-phase alternating currents.

2. A rotary synchronous machine as recited in claim 1, wherein said armaturewindings are excited by multi-phase alternating currents to produce a rotating magnetic field for rotationaldrive, and said rotating magnetic field for rotational drive synchronizes with said rotating magnetic field produced by said field windings of said magnetic field core in a predetermined phase relationship thereto, whereby said rotor rotates with rotation of said rotating magnetic field produced by said armature windings.

3. A rotary synchronous machine as recited in claim 1, wherein said rotor is rotated mechanically by an external force, and wherein said multi-phase alternating currents to be supplied to said-field windings of said magnetic field core are generated in synchronism with rotation of said rotor so as to produce said rotating magnetic field with rotation of said rotor.

4. A rotary synchronous machine comprising:
a stator frame;
a cylindrical armature core secured along an inner surface of said stator frame and having armature windings that extend along a direction of rotation and are sequentially received in slots formed radially in said armature core;
a rotor rotatable relative to said stator frame and having a plurality of cylindrical magnetic substance segments separated from each other in the direction of rotation;
a first magnetic field core secured to a first predetermined location of said stator frame in magnetically-separated relation to said armature core and having first field windings positioned thereon, said first field windings being excited by multi-phase alternating currents to produce a rotating magnetic field;
a second magnetic field core secured to a second predetermined location of said stator frame in magnetically-separated relation to said armature core and having second field windings positioned thereon, said second field windings being excited by multi-phase alternating currents to produce a rotating magnetic field; and
a linear position detector, said linear position detector detects a positional relationship between the stator frame and the rotor and outputs a positional signal,
wherein said magnetic substance segments of said rotor each have an axial end surface spaced from said first magnetic field core via a first air gap, said magnetic substance segments of said rotor each have a circumferential surface spaced from said armature core via a second air gap, said magnetic substance segments of said rotor each have another axial end surface spaced from said second magnetic field core via a third air gap, magnetic flux paths of said rotating magnetic field produced from said first magnetic field core pass through said first magnetic field core, said first air gap, said magnetic substance segments, said second air gap and said armature core to thereby produce magnetic poles on the surfaces of said magnetic substance segments facing said first and second air gaps, and magnetic flux paths of said rotating magnetic filed produced from said second magnetic field core pass through said second magnetic field core, said third air gap, said magnetic substance segments, said second air gap and said armature core to thereby produce magnetic poles on the surfaces of said magnetic substance segments facing said third and second air gaps,
wherein an axial thrust depending on a difference between first intensity of the multi-phase alternating currents supplied to the first field windings and second intensity of the multi-phase alternating currents supplied to the second field windings is produced in said rotor, and
wherein said axial thrust is controlled by controlling at last one of said first and second intensities of the multi-phase alternating currents.

5. A rotary synchronous machine as recited in claim 4 which further comprises a current control device that separately controls respective intensity of the multi-phase alternating current to be supplied separately to said first and second field winding, to thereby control the axial thrust of said rotor.

6. A rotary synchronous machine as recited in claim 4 wherein a cylindrical permanent magnet is provided around an outer peripheral surface of said cylindrical magnetic substance segments of said rotor.

7. A rotary synchronous machine as recited in claim 6 wherein the cylindrical magnetic substance segments of said rotor is tapered at least one end portion thereof to provide a conically slanted surface and said first magnetic field core and second magnetic field core are provided to be magnetically coupled with the conically slanted surface of said rotor.

8. A rotary synchronous machine as recited in claim 4 wherein the cylindrical magnetic substance segments of said rotor is tapered at least one end portion thereof to provide a conically slanted surface and said first magnetic field core and second magnetic field core are provided to be magnetically coupled with the conically slanted surface of said rotor.

9. A rotary synchronous machine as recited in claim 4, wherein said armature windings are excited by multi-phase alternating currents to produce a rotating magnetic field for rotational drive, and said rotating magnetic field for rotational drive synchronizes with said first and second rotating magnetic fields produced by said first and second field windings of said first and second magnetic field cores in a predetermined phase relationship thereto, whereby said rotor rotates with rotation of said rotating magnetic field produced by said armature windings.

10. A rotary synchronous machine as recited in claim 2, wherein said rotor is rotated mechanically by an external force, and wherein said multi-phase alternating currents to be supplied to said first and second field windings of said first and second magnetic field cores are generated in synchronism with rotation of said rotor so as to produce said rotating magnetic field with rotation of said rotor.

11. A rotary synchronous machine including a plurality of rotary synchronous machine structures connected together along an axis of a same rotation shaft, at least one of the plurality of rotary synchronous machine structures being an improved rotary synchronous machine structure, said improved rotary synchronous machine structure comprising:
a stator frame;
an armature core secured to said stator frame and having armature windings sequentially wound thereon in a direction of rotation;
a rotor rotatable relative to said stator frame and having a plurality of magnetic substance segments which are magnetically separated from each other in the direction of rotation;
first and second magnetic field cores secured to said stator frame in magnetically-separated relation to said armature core, each of said first and second magnetic field cores having field windings positioned thereon, said field windings being excited by multi-phase alternating currents to produce a rotating magnetic field independently in each of said first and second magnetic field cores; and
a linear position detector, said linear position detector detects a positional relationship between the stator frame and the rotor and outputs a positional signal,
wherein said magnetic substance segments of said rotor each have axial end surfaces spaced from said magnetic field cores via first air gaps, said magnetic substance segments of said rotor each have a circumferential surface spaced from said armature core via a second air gap, and magnetic flux paths of said rotating magnetic field produced from each one of said magnetic field cores pass through said one of said magnetic field cores, one of said first air gaps, said magnetic substance segments, said second air gap, and said armature core to thereby produce magnetic poles on the surfaces of said magnetic substance segments facing said one of said first air gaps and said second air gap, wherein an axial thrust depending on a difference between first intensity of the multi-phase alternating currents supplied to the field windings of said first magnetic core and second intensely of the multi-phase alternating currents supplied to the field windings of said second magnetic core is produced in said rotor, and wherein said axial is controlling at least one of said first and second intensities of the multi-phase alternating currents.

12. A rotary synchronous machine as recited in claim 11, wherein said armature windings are excited by multi-phase alternating currents to produce a rotating magnetic field for rotational drive, and said rotating magnetic field for rotational drive synchronizes with said rotating magnetic field produced by said field windings of said magnetic field core in a predetermined phase relationship thereto, whereby said rotor rotates with rotation of said rotating magnetic field produced by said armature windings.

13. A rotary synchronous machine including a plurality of rotary synchronous machine structures connected together along an axis of a same rotation shaft, at least one of the plurality of rotary synchronous machine structures being an improved rotary synchronous machine structure, said improved rotary synchronous machine structure comprising:

a stator frame;

a cylindrical armature core secured along an inner surface of said stator frame and having armature windings that extend along a direction of rotation and are sequentially received in slots formed radially in said armature core;

a rotor rotatable relative to said stator frame and having a plurality of cylindrical magnetic substance segments separated from each other in the direction of rotation;

a first magnetic field core secured to a first predetermined location of said stator frame in magnetically-separated relation to said armature core and having first field windings positioned thereon, said first field windings being excited by multi-phase alternating currents to produce a rotating magnetic field;

a second magnetic field core secured to a second predetermined location of said stator frame in magnetically-separated relation to said armature core and having second field windings positioned thereon, said second field windings being excited by multi-phase alternating currents to produce a rotating magnetic field; and a linear position detector, said linear position detector detects a positional relationship between the stator frame and the rotor and outputs a positional signal, wherein said magnetic substance segments of said rotor each have an axial end surface spaced from said first magnetic. field core via a first air gap, said magnetic substance segments of said rotor each have a circumferential surface spaced from said armature core via a second air gap, said magnetic substance segments of said rotor each have another axial end surface spaced from said second magnetic field core via a third air gap, magnetic flux paths of said rotating magnetic field produced from said first magnetic field core pass through said first magnetic field core, said first air gap, said magnetic substance segments, said second air gap and said armature core to thereby produce magnetic poles on the surfaces of said magnetic substance segments facing said first and second air gaps, and magnetic flux paths of said rotating magnetic filed produced from said second magnetic field core pass through said second magnetic field core, said third air gap, said magnetic substance segments, said second air gap and said armature core to thereby produce magnetic poles on the surfaces of said magnetic substance segments facing said third and second air gaps, wherein an axial thrust depending on a difference between first intensity of the multi-phase alternating currents supplied to the first field windings and second intensity of the multi-phase alternating currents supplied to the second field windings is produced in said rotor, and wherein said axial thrust is controlled by controlling at least one of said first and second intensities of the multi-phase alternating currents.

14. A rotary synchronous machine as recited in claim 13, wherein said at least one of said rotary machine structures further comprises a current control device that separately controls respective intensity of the multi-phase alternating current to be separately to said first and second field winding, to thereby control the axial thrust of said rotor.

15. A rotary synchronous machine as recited in claim 9, wherein said armature windings are excited by multi-phase alternating currents to produce a rotating magnetic field for rotational drive, and said rotating magnetic field for rotational drive synchronizes with said first and second rotating magnetic fields produced by said first and second field windings of said first and second magnetic field cores in a predetermined phase relationship thereto, whereby said rotor rotates with rotation of said rotating magnetic field produced by said armature windings.

16. A rotary synchronous machine comprising:

a stator frame;

an armature core secured to said stator frame and having armature windings sequentially wound thereon in a direction of rotation;

a rotor rotatable relative to said stator frame and having a plurality of magnetic substance segments which are magnetically separated from each other in the direction of rotation;

first and second magnetic field cores secured to said stator frame in magnetically-separated relation to said armature core, each of said first and second magnetic field cores having field windings positioned thereon for producing a rotating magnetic field independently in each of said first and second magnetic field cores; and a linear position detector, said linear position detector detects a positional relationship between the stator frame and the rotor and outputs a positional signal, wherein said magnetic substance segments of said rotor each have axial end surfaces spaced from said magnetic field cores via first air gaps, said magnetic substance segments of said rotor each have a circumferential surface spaced from said armature core via a second air gap, and magnetic flux paths of said rotating magnetic field produced from each one of said magnetic field cores pass through said one of said magnetic field cores, one of said first air gaps, said magnetic substance segments, said second air gap and said armature core to thereby produce magnetic poles on the surfaces of said magnetic substance segments facing said one of said first air gaps and said second air gap, wherein an axial thrust depending on a difference between first intensity of exciting currents supplied to the field windings of said first magnetic core and second intensity of exciting currents supplied to the field windings of said second magnetic core is produced in said rotor, and wherein said axial thrust is controlled by controlling at least one of said first and second intensities of said exciting currents.

17. A rotary synchronous machine comprising:

a stator frame;

a cylindrical armature core secured along an inner surface of said stator frame and having armature windings that extend along a direction of rotation and are sequentially received in slots-formed radially in said armature core;

a rotor rotatable relative to said stator frame and having a plurality of cylindrical magnetic substance segments separated from each other in the direction of rotation;

a first magnetic field core secured to a first predetermined location of said stator frame in magnetically-separated relation to said armature core and having first field windings positioned thereon for producing a rotating magnetic field;

a second magnetic field core secured to a second predetermined location of said stator frame in magnetically-separated relation to said armature core and having second field windings positioned thereon for producing a rotating magnetic field; and a linear position detector, said linear position detector detects a positional relationship between the stator frame and the rotor and outputs a positional signal, wherein said magnetic substance segments of said rotor each have an axial end surface spaced from said first magnetic field core via a first air gap, said magnetic substance segments of said rotor each have a circumferential surface spaced from said armature core via a second air gap, said magnetic substance segments of said rotor each have another axial end surface spaced from said second magnetic field core via a third air gap, magnetic flux paths of said rotating magnetic field produced from said first magnetic field core pass through said first magnetic field core, said first air gap,.said magnetic substance segments, said second air gap and said armature core to thereby produce magnetic poles on the surfaces of said magnetic substance segments facing said first and second air gaps, and magnetic flux paths of said rotating magnetic filed produced from said second magnetic field core pass through said second magnetic field core, said third air gap, said magnetic substance segments, said second air gap and said armature core to thereby produce magnetic poles on the surfaces of said magnetic substance segments facing said third and second air gaps, wherein an axial thrust depending on a difference between first intensity of exciting currents supplied to the first windings and second intensity of exciting currents supplied to the first field windings and second intensity of exciting currents supplied to the second field windings is produced in said rotor, and wherein said axial thrust is controlling at least one of said first and second intensities of the exciting currents.

\* \* \* \* \*